United States Patent
Uyehara

(10) Patent No.: US 8,503,970 B1
(45) Date of Patent: Aug. 6, 2013

(54) PORTABLE COMMUNICATION DEVICE AND SYSTEM WITH INTERCHANGEABLE SPEAKER MODULES

(75) Inventor: Chad Tyler Uyehara, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 2206 days.

(21) Appl. No.: 11/219,018

(22) Filed: Sep. 1, 2005

(51) Int. Cl.
  *H04B 1/08* (2006.01)
(52) U.S. Cl.
  USPC .......... 455/350; 455/347; 455/349; 455/90.3; 455/575.1; 455/575.8; 455/569.1; 379/428.01; 379/428.04; 379/433.01; 379/433.02; 379/433.1; 379/433.11
(58) Field of Classification Search
  USPC .......... 455/556.1–2, 557, 569.1–2, 572–573, 455/90.3, 344–350, 575.1, 575.8, 575.9; 379/420.01–4, 432–434, 428.01, 428.04
  See application file for complete search history.

(56) References Cited

U.S. PATENT DOCUMENTS

| | | | |
|---|---|---|---|
| 5,138,262 A | | 8/1992 | Podhrasky et al. |
| 5,655,017 A | * | 8/1997 | Fishman ................. 379/420.02 |
| 5,786,106 A | * | 7/1998 | Armani ........................ 429/98 |
| 5,864,766 A | * | 1/1999 | Chiang ........................ 455/572 |
| 5,933,330 A | | 8/1999 | Beutler et al. |
| 5,973,477 A | * | 10/1999 | Chang ........................ 320/114 |
| D476,292 S | | 6/2003 | Lee |
| 2004/0204170 A1 | * | 10/2004 | Mkhitarian ................ 455/572 |
| 2004/0204194 A1 | * | 10/2004 | Akai et al. ................ 455/575.1 |

* cited by examiner

Primary Examiner — Tuan A Tran

(57) ABSTRACT

An exemplary portable communication device and system comprises interchangeable speaker modules allowing different speakers to be used with a portable communication device assembly. The speaker modules and the portable communication device assembly form portable communication devices when the speaker modules are secured to the portable communication device assembly. In the exemplary embodiment, a slim speaker module includes a speaker suitable for operation during proximate communications where the portable communication device is placed near the user's ear. An extended speaker module includes a larger speaker providing improved performance during non-proximate communications where the portable communication device is positioned away from the ear such as during a push-to-talk (PTT) call or when a speaker phone option is invoked. In the exemplary embodiment, the speaker modules also perform the function of a battery compartment door. Accordingly, speaker modules are interchanged by selecting an appropriate battery compartment door.

7 Claims, 3 Drawing Sheets

PORTABLE COMMUNICATION DEVICE AND SYSTEM WITH INTERCHANGEABLE SPEAKER MODULES

FIELD OF THE INVENTION

The invention relates in general to portable communication devices and more specifically to a portable communication device and system with interchangeable speaker modules.

BACKGROUND OF THE INVENTION

Portable communication devices such as cellular telephones include speakers for presenting audio signals to a user. The speaker converts electrical signals into voice, music, tones, ring tones and other acoustic data. The maximum acoustic energy of the signal produced by the speaker depends, at least in part, on the size of the speaker. In many conventional devices, the size of the speaker is often minimized in order to minimize the size and cost of the portable device. Relatively small speakers are used in devices that are intended to be placed near the user's ear during operation. Although the speaker may be used on a speaker phone mode in low noise environments, the primary purpose of the speaker is for proximate use where the speaker is near the user's ear. The speaker, therefore, is positioned within the portable device such that the speaker is placed near the user's ear during communication. The short distance between the ear and the speaker allows the user to hear the audio signals although the magnitudes of the signals are relatively low. In some devices however, larger speakers must be used in order to produce sound at adequate volume for other uses. For example, push-to-talk (PTT) devices operate in accordance with two-way radio techniques where the device is held in front of the user's face and not against the ear. During operation, the speaker must be able to produce sound at power levels adequate to overcome the distance between the speaker and the ear as well as any noise that may be present.

Conventional portable communication devices are limited in that the speaker is the optimum size for only some of the uses of the device. Devices are therefore manufactured for use in only limited situations. For example, a non-PTT cellular telephone may not provide adequate sound levels in a PTT operation and the larger speaker in a PTT device is not needed in non-PTT operation unnecessarily increasing cost and size of the portable communication device.

DETAILED DESCRIPTION OF THE PREFERRED EMBODIMENTS

A portable communication device and system in accordance with the exemplary embodiment comprises interchangeable speaker modules allowing different speakers to be used with a portable communication device assembly. The speaker modules and the portable communication device assembly form portable communication devices when the speaker modules are secured to the portable communication device assembly. In the exemplary embodiment, a slim speaker module includes a speaker suitable for operation during proximate communications where the portable communication device is placed near the user's ear or during low noise conditions. An extended speaker module includes a larger speaker providing increased acoustic energy levels during non-proximate communications where the portable communication device is positioned away from the ear such as during a push-to-talk (PTT) call or when a speaker phone option is invoked. In the exemplary embodiment, the speaker modules also perform the function of a battery compartment door. Accordingly, speaker modules are interchanged by selecting an appropriate battery compartment door. A single communication device assembly can be used to form multiple portable communication devices reducing manufacturing costs.

Figure 1:
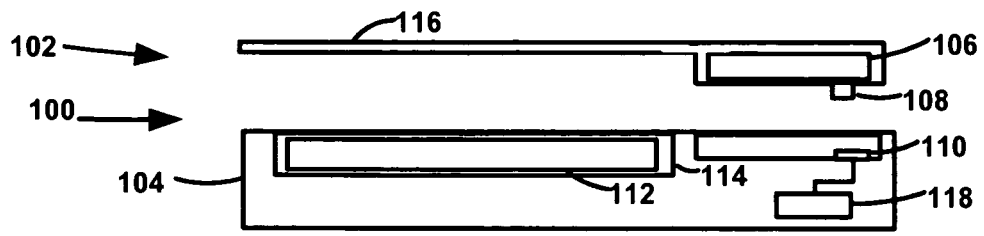
FIG. 1 is a block diagram of an exploded side view of a portable communication device with a slim speaker module in accordance with the exemplary embodiment of the invention.
Figure 2:
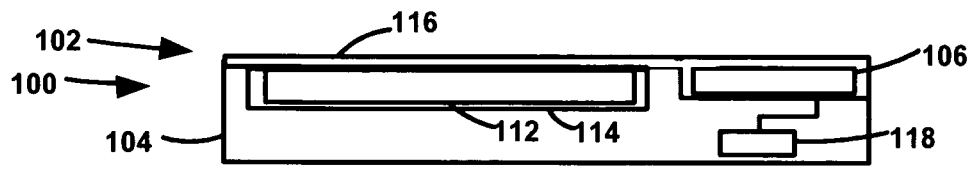
FIG. 2 is a block diagram of a side view of the portable communication device with the slim speaker module connected to the portable communication device assembly in accordance with the exemplary embodiment of the invention.
Figure 3:
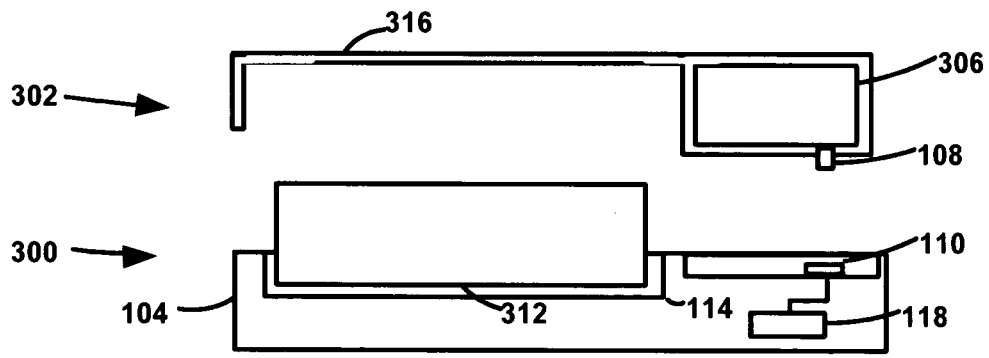
FIG. 3 is a block diagram of an exploded side view of a portable communication device with an extended speaker module in accordance with the exemplary embodiment of the invention.
Figure 4:
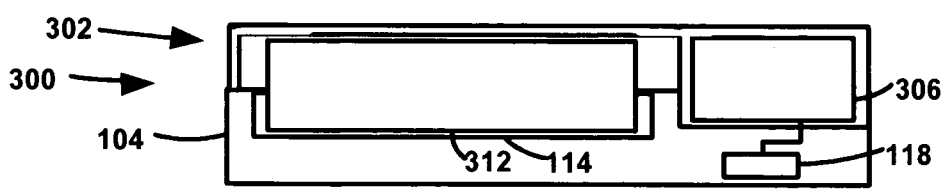
FIG. 4 is a block diagram of a side view of the portable communication device with the extended speaker module connected to the portable communication device assembly in accordance with the exemplary embodiment of the invention.

FIG. 1, FIG. 2, FIG. 3, and FIG. 4 are block diagrams of side views of portable communication devices 100, 300 in accordance with the exemplary embodiment of the invention. The portable communication device 100 discussed with reference to FIG. 1 and FIG. 2 includes a slim speaker module 102 and the portable communication device 300 discussed with reference to FIG. 3 and FIG. 4 includes an extended speaker module 302. The blocks in FIG. 1, FIG. 2, FIG. 3, and FIG. 4 generally represent exemplary relative configurations of the portable device assembly 104 and the speaker modules 102, 302 and do not necessarily represent all relative sizes or positions of the components illustrated. The device assembly 104 and each speaker module 102, 302 form the portable communication devices 100, 300. FIG. 2 and FIG. 4 are block diagrams of the portable communication devices 100, 300 with the speaker modules 102, 302 attached to the device assembly 104.

FIG. 1 is a block diagram of an exploded side view of a portable communication device 100 with a slim speaker module 102 in accordance with the exemplary embodiment of the invention. FIG. 2 is a block diagram of a side view of the portable communication device 100 with the slim speaker module 102 connected to the portable communication device assembly 104 in accordance with the exemplary embodiment. The portable device assembly 104 includes electrical and mechanical components that facilitate wireless communication as well as other functions. In the exemplary embodiment, the portable device assembly 104 includes input and output devices such as displays, keypads, buttons, and a microphone in addition to a plastic housing, printed circuit board, antenna, electrical circuitry and other components. In addition to communication circuits, the portable communication device assembly 104 includes an audio circuit 118 for driving the speaker 106. The audio circuit 118 may include any combination of amplifiers, filters, and/or matching circuits.

The speaker module 102 includes a speaker 106 secured to a module housing 116. The module housing 116 is a single plastic battery compartment door in the exemplary embodiment. The speaker 106 may be secured to the module housing 116 using any of several techniques. An example of a suitable securing technique includes an arrangement of tabs configured to secure the speaker 106 when snapped into position. Other securing techniques include bonding, gluing, or screwing the speaker 106 to the module housing 114 as well as securing the speaker using a compression fit. In some circumstances, a gasket is positioned between the speaker 106 and the module housing 114.

The speaker 106 within the speaker module 102 connects to the portable communication device assembly 104 to form the audio output device of the portable communication device 100. In the exemplary embodiment, electrical connectors 108 such as spring contacts connected to the speaker 106 contact connection pads 110 of the portable device assembly 104 to form electrical connections between the speaker 106 and the audio circuit 118 of the portable communication device assembly 104. Examples of other suitable techniques for forming electrical connections include using pogo connectors, board-to-board connectors and wires with connectors.

When the slim speaker module 102 is secured to the portable communication device assembly 104, the speaker 106 is electrically connected to the portable communication device assembly 104. In the exemplary embodiment, a portion of the speaker 106 fits within a speaker recess 116 of the device assembly 104. In some circumstances, however, the entire speaker 106 may be positioned outside of the device assembly 104.

A slim battery 112 is positioned within a battery compartment 114 of the device assembly 104. In the exemplary embodiment, the slim speaker module 102 functions as a battery compartment door to enclose the slim battery 112 within the battery compartment 114. In some situations, the battery 112 may be secured within the speaker module 102. In such situations, different sized batteries may be used with different speakers within the speaker modules 102, 302.

FIG. 3 is a block diagram of an exploded side view of a portable communication device 300 with an extended speaker module 302 in accordance with the exemplary embodiment of the invention. FIG. 4 is a block diagram of a side view of the portable communication device 300 with the extended speaker module 302 connected to the portable communication device assembly 104 in accordance with the exemplary embodiment. The extended speaker module 302 includes an extended speaker 306 that is larger than the slim speaker 106. In the exemplary embodiment, an extended battery 312 is inserted into the battery compartment 114 when the extended speaker module 302 is used. The speaker module 302 connects to the device assembly 104 to provide an audio output device providing greater audio power than the slim speaker module 102. Accordingly, the extended speaker module 302 provides improved performance over the slim speaker module 102.

The module housing 316 of the extended speaker module 302 is larger to accommodate the larger speaker 306. The portions of the extended speaker module 302 that interface with the portable communication device assembly 104 are the same as the portions of the slim speaker module 102 allowing both speaker modules 102, 302 to be connected to the same portable communication device assembly 104.

Therefore, the slim speaker module 102 connects to the device assembly 104 to form the portable communication device 100 having a relatively slim industrial design and the extended speaker module 302 is used to provide increased audio power in a portable communication device 300.

One or both of the speakers 106, 306 may be enclosed within sealed or ported speaker enclosures of the speaker modules 102, 302. The speaker enclosure characteristics are selected to enhance the performance of the speakers 106, 306. For example, the volume of the speaker enclosure may be selected in accordance with the particular speaker characteristics using acoustics principles.

In the exemplary embodiment, the portable device assembly 104 does not include any audio output devices. In some circumstances, however, the portable communication device assembly 104 may include other speakers, tone generators, or vibratory devices.

In the exemplary embodiment, a single audio amplifier within the device assembly 104 amplifies audio signals. In some situations, the portable communication device assembly 104 may include circuitry and/or software for detecting which speaker module 102, 302 is attached. Adjustments of the audio circuitry based on the detection allow efficient interaction with the speaker 106, 306. Also, in some circumstances, different audio amplifiers may be implemented within the different speaker modules 102, 302. In such circumstances, additional connectors may be necessary to provide connections to power, ground and volume control.

Figure 5:
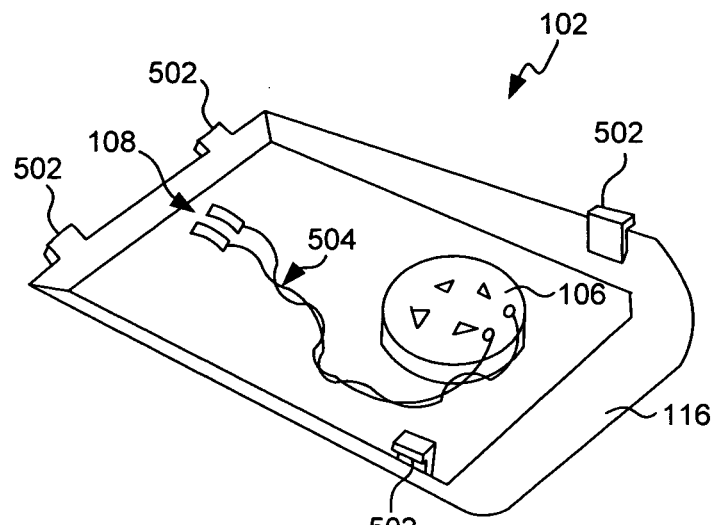
FIG. 5 is an illustration of a perspective top view of a slim speaker module in accordance with the exemplary embodiment of the invention.
Figure 6:
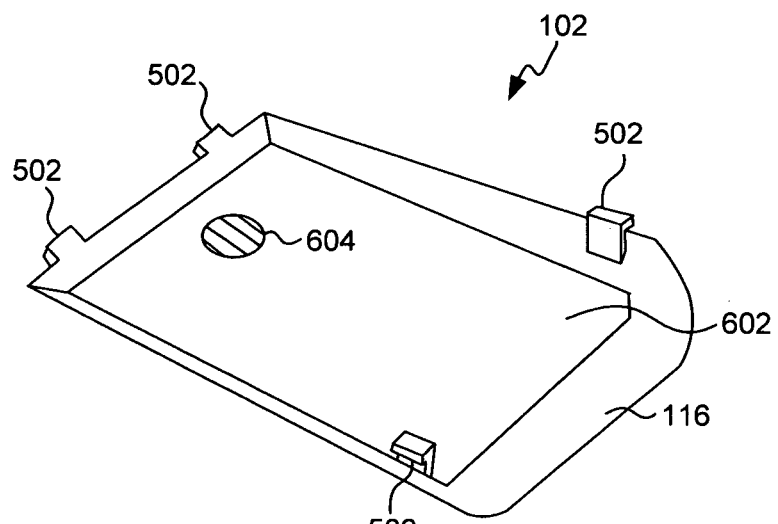
FIG. 6 is an illustration of a perspective top view of the slim speaker module with an enclosure sheet in accordance with the exemplary embodiment of the invention.

FIG. 5 is an illustration of a perspective top view of a slim speaker module 102 and FIG. 6 is an illustration of a perspective top view of the slim speaker module 102 with the enclosure sheet 602 in accordance with the exemplary embodiment of the invention. In the interest of brevity, similar illustrations of the extended speaker module 302 have been omitted. In the exemplary embodiment, the slim speaker module 102 and the extended speaker module 302 are the same accept except that the module housing 316 of the extended speaker module 302 is deeper than the module housing 116 of the slim speaker module 102 and the speaker 306 in the extended speaker module 302 is larger than the speaker 106 in the slim speaker module 102. In some circumstances, the larger speaker 306 may be mounted within the module housing 316 that is the same size and the slim module housing 116. For example, a standard sized housing may include a smaller enclosure for use with the smaller speaker 106 and a larger enclosure for the larger speaker 306. In other circumstances, the enclosure for the larger speaker 306 is formed within a module housing 316 that has the same depth as the slim speaker housing 116. A larger enclosure in the extended speaker module 302 may be formed by increasing the width of the module housing 316.

Any of several techniques may be used to secure the speaker and the spring contacts 108 to the speaker module housing 116. For example, adhesives or epoxies may be used to connect the speaker 106 and spring contacts 108 to the module housing 116. In some circumstances, the module housing 116 may include mounting brackets or clips (not shown) configured to receive and firmly hold the speaker 106 and spring contacts 108 when snapped into position. Other techniques may be used in some circumstances. The speaker 106 is connected to the spring contacts 108 with wires 504 in the exemplary embodiment.

The enclosure sheet 602 is attached to the module housing 116 to form a sealed (or at least partially sealed) enclosure. The spring contacts 108 are accessible through an opening 604 in the enclosure sheet 602. In the exemplary embodiment, the spring contacts 108 are secured to the enclosure sheet 602. Such a configuration allows the enclosure to be completed completely sealed since the speaker 106 can be connected to the spring contacts 108 through the enclosure sheet 602 through a sealed opening. In some circumstances, the spring contacts 108 protrude through the enclosure sheet 602.

The speaker modules 102, 302 include securing tabs 502 that engage complementary features on the communication device assembly 104 to secure the speaker modules 102, 302. In the exemplary embodiment, the securing tabs 502 on the extended speaker module 302 are the same size and are located in same relative position as the securing tabs 502 on the slim speaker module 102. Accordingly, the speaker modules 102, 302 can be easily interchanged. As explained above, the extended speaker module includes a larger speaker 306 and a larger speaker enclosure than the slim speaker module 102.

Figure 7:
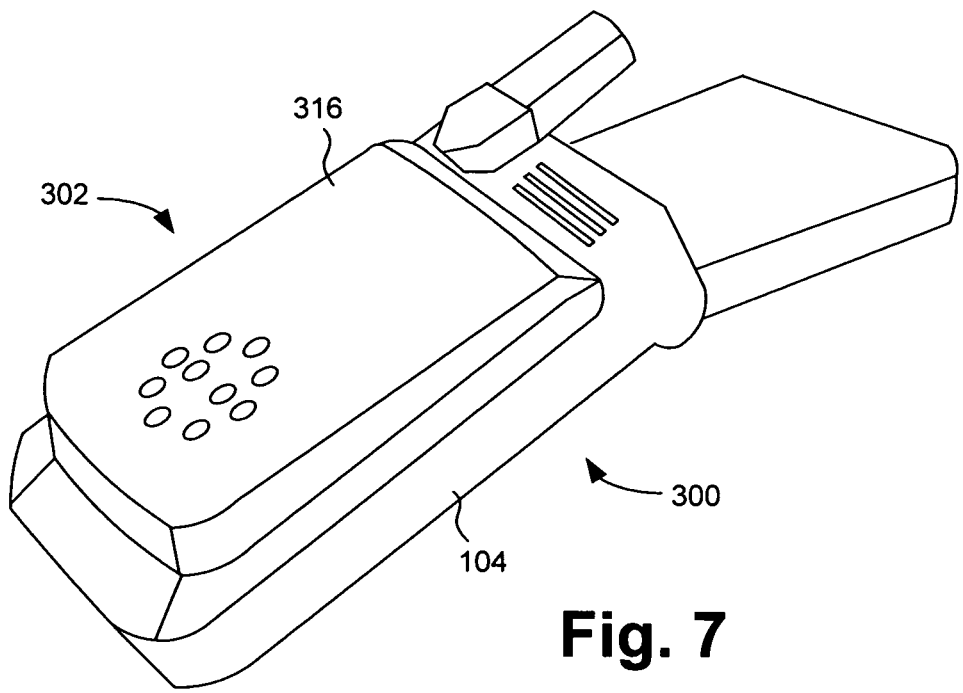
FIG. 7 is an illustration of a perspective bottom view of the portable communication device with the extended speaker module in accordance with the exemplary embodiment of the invention
Figure 8:
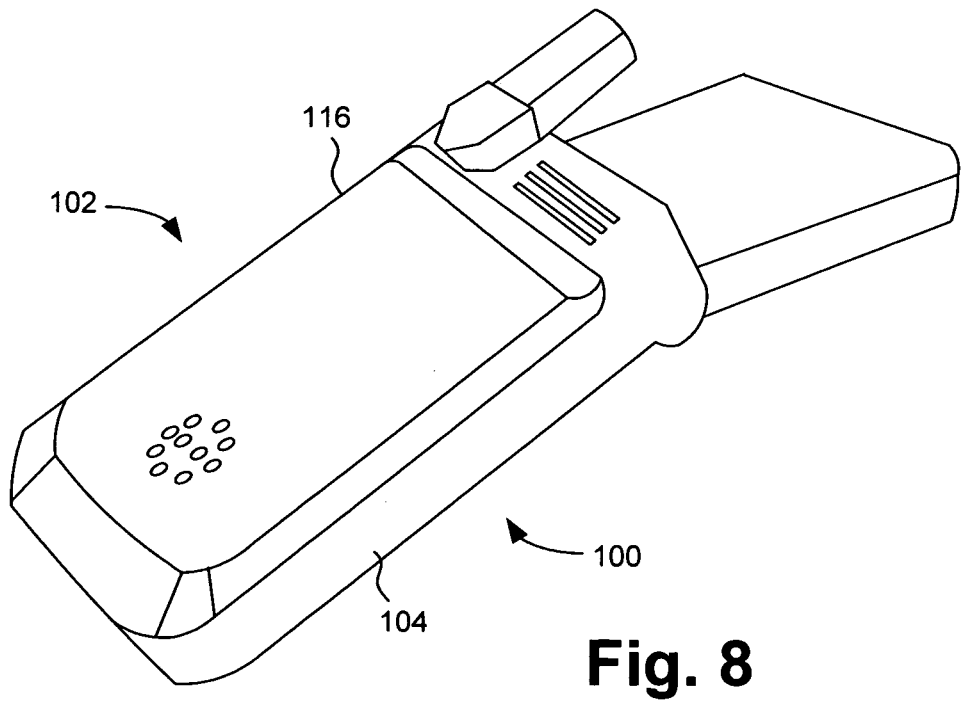
FIG. 8 is an illustration of a perspective bottom view of the portable communication device with a slim speaker module in accordance with the exemplary embodiment of the invention.

FIG. 7 is an illustration of a perspective bottom view of the portable communication device 300 with the extended speaker module and FIG. 8 is an illustration a perspective bottom view of the portable communication device 100 with a slim speaker module 102 in accordance with the exemplary embodiment. The portable communication device 300 formed with the extended speaker module 302 is thicker than the portable communication device 100 formed with the slim speaker module 102. The larger speaker 306 in the extended speaker module 302 provides a higher audio output than the speaker 106 in the slim speaker module 102 allowing increased performance during PTT communications and/or during speaker phone modes.

Therefore, in the exemplary embodiment, a portable communication device system includes a portable communication device assembly 104 and a plurality of speaker modules 102, 302 that include different sized speaker 106, 306. The slim speaker module 102 includes a relatively small speaker 106 suitable for proximate communications where the portable communication device 100 is operated near the user's ear while the extended speaker module 302 includes a larger speaker 306 better suited for PTT operation and speaker phone mode. Since the speaker modules 102, 302 also function as battery compartment doors in the exemplary embodiment, the portable communication device assembly 104 may be adapted to form the desired portable communication device 100, 300 by selecting the appropriate battery compartment door (102, 302).

Clearly, other embodiments and modifications of this invention will occur readily to those of ordinary skill in the art in view of these teachings. The above description is illustrative and not restrictive. This invention is to be limited only by the following claims, which include all such embodiments and \modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A detachable speaker module comprising:
    a module housing configured to replace a battery compartment door of a portable communication device comprising a portable communication device assembly configured to connect to the battery compartment door;
    a speaker secured to the module housing;
    an attachment mechanism configured to secure the module housing to a the portable communication device assembly in place of the battery compartment door; and
    electrical contacts configured to provide an electrical connection between the portable communication device assembly and the speaker.

2. The detachable speaker module of claim 1, wherein the module housing is configured to cover a battery compartment of the portable communication device assembly when the module housing is secured to the portable communication device assembly in a closed position.

3. The detachable speaker module of claim 2, further comprising a battery.

4. The detachable speaker module of claim 2, wherein the module housing is a selected module housing of a plurality of module housings.

5. The detachable speaker module of claim 2, further comprising:
    an enclosure sheet connected to the module housing to form a speaker enclosure around the speaker.

6. The detachable speaker module of claim 1, wherein the attachment mechanism comprises a connection tab configured to engage the portable communication device assembly to secure the detachable speaker module to the portable communication device assembly.

7. The detachable speaker module of claim 1, wherein the electrical contacts are configured to form electrical connections between the speaker and an audio circuit in the portable communication device assembly.

* * * * *